United States Patent Office 3,444,980
Patented May 20, 1969

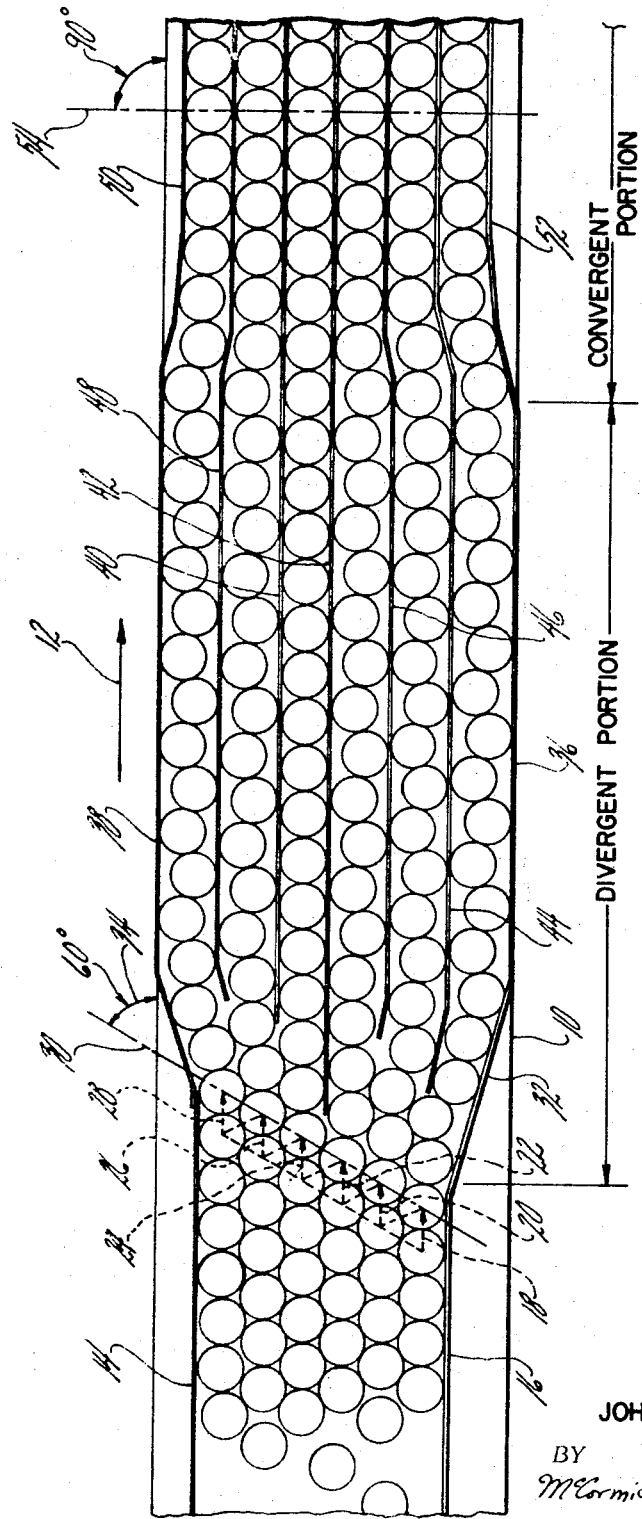

3,444,980
METHOD AND MEANS FOR REORIENTING NESTED ARTICLES ON A CONVEYOR TO FORM LATERALLY ALIGNED COLUMNS
John A. Wiseman, Glastonbury, Conn., assignor to Emhart Corporation, Bloomfield, Conn., a corporation of Connecticut
Filed Sept. 27, 1967, Ser. No. 670,846
Int. Cl. B65g 47/26
U.S. Cl. 198—30                    6 Claims

ABSTRACT OF THE DISCLOSURE

Cans are conveyed between fixed side rails which are spaced laterally to cause the cans to nest in staggered, interfitting, adjacent columns. The side rails form a divergent portion downstream of this nested pattern, and a plurality of guide rails are arranged in the divergent portion to receive the columns of cans in lanes of various widths. An inner lane is just wide enough to accommodate the cans in longitudinally aligned relationship, and the lanes adjacent thereto are slightly wider than said inner lane so that one-half a can diameter is "made up" in a predetermined lane length in order to align the can columns laterally at the downstream end of said divergent portion. The next adjacent lanes in said divergent portion are also slightly wider than the inner lane, and a whole can diameter is "made up" in these latter lanes as a result of the width of the lanes and also as a result of the longer path taken in these outer lanes as a result of the cans having to follow an arcuate path through said divergent portion.

Summary of invention

The present invention relates to orienting cylindrical articles, such as cans, on a continuously moving conveyor, and deals more particularly with a method and means for reorienting nested articles to form columns thereof which are arranged in side-by-side relationship for entry into a packer or the like.

The general object of the present invention is to provide a method and means for reorienting nested articles with a minimum of agitation into a number of columns arranged in side-by-side relationship.

Brief description of drawing

The single figure comprises a schematic view of a continuously moving conveyor upon which guide rails are provided in accordance with the method and means of the present invention.

Detailed description

Turning now to the drawing in greater detail, a continuously moving conveyor is indicated at 10 and extends the full length of the apparatus shown. A plurality of cylindrically shaped articles, such as cans, are provided at the upstream end of the conveyor 10 so as to be advanced in the direction of the arrow 12 toward the downstream end of said conveyor. Side rail means are provided for confining the articles laterally as they are so advanced, and an upstream portion of said side rail means, indicated generally at 14 and 16, comprises generally parallel rails which are so spaced as to cause the articles to form a nested pattern wherein the centers of any three adjacent articles form an equilateral triangle having one side aligned with the longitudinal direction of movement of the conveyor 10 and defining a plurality of staggered, interfitting, adjacent columns of articles. Each of the columns is defined by the lower side of the triangles shown as indicated generally at 18, 20, 22, 24, 26 and 28.

It is a feature of the present invention that at least three such columns of articles are provided, and in the embodiment shown six such columns are advanced between the side rails 14 and 16. The actual spacing between the side rails 14 and 16, X, can be determined by the relationship; $X=$ diameter of can multiplied by sine 60 degrees multiplied by the number of columns of cans to be handled. It will be apparent that the reference line 30 must of necessity form an angle of 60 degrees with the longitudinal direction of movement of the conveyor 10.

The side rail means referred to above also define a divergent portion of the apparatus, which divergent portion is located downstream of the nested pattern of articles. Preferably, said divergent portion is defined by laterally outwardly inclined rails 32 and 34 in conjunction with the parallel rail portions indicated generally at 36 and 38. In accordance with the present invention, guide rail means are also provided in the divergent portion to urge the outside columns 18, 20 and 26, 28 laterally outwardly, and said guide rail means are spaced apart by a lateral distance greater than one article diameter but less than two such article diameters so as to accommodate more articles in a given distance in said outside columns than are accommodated in an inner column, as for example the inner column 24 in FIG. 1. The innermost guide rails 40 and 42 are parallel to one another throughout their length and are spaced apart laterally a distance corresponding, at least approximately, to the diameter of one of said articles to define an inner lane for said inner column of articles.

The actual number of guide rails associated with said inner guide rail means will of course vary, depending upon the number of columns of articles to be accommodated. In the example shown, 6 such columns are provided so that 5 such inner guide rails are required. More particularly, the guide rail 44 can be seen to include an inclined upstream portion which urges the cans in column 18 laterally outwardly, and said guide rail 44 is preferably parallel to the side rail portion 36 so as to define a relatively wide lane therebetween capable of accommodating a greater number of articles than is associated with the inner lane defined between guide rails 40 and 42. Further, the inner guide rail 46 defines a similar lane in cooperation with the guide rail 44 just described wherein a greater number of articles is accommodated than is associated with the inner lane mentioned above. Finally, the inner guide rail 48 can be seen to define a relatively wide lane associated with the column 28.

The side rail means further include a convergent portion of the apparatus defined between the side rail portions 50 and 52 wherein the articles are urged laterally inwardly toward one another to form parallel side-by-side lanes for accommodating the articles in longitudinally aligned as well as laterally aligned relationship. The convergent portion is so arranged with respect to the divergent portion that all of the articles in the various columns are arranged in side-by-side relationship with a minimum of article agitation. Thus, each of the lanes adjacent the inner lane has a width and length in the divergent portion such that it can accommodate at least one half an article more than said inner lane. Further, each of the lanes next adjacent said inner lane have a width and length such that it can accommodate at least one whole article more than said inner lane. More specifically, the reference line 54 can be seen to define a 90° angle with the longitudinal direction of movement of the conveyor 10. If the actual number of articles between the upstream end of the divergent portion and the reference line 54 are actually counted, it will be found that the number of articles in the inner lane associated with the column 24 numbers 25 articles. The adjacent lanes associated with the columns 22 and 26 will be found to contain 25 and one half articles. The next adjacent lanes associated with the columns 20 and 28 will be found to contain 26 articles. Thus, it is an important feature of the present invention that the lanes adjacent the inner lane accommodate at least one-half an article more than the inner lane, and that the next adjacent lanes accommodate at least one whole article more than said inner lane in order to produce parallel lanes of such articles wherein articles in adjacent lanes are abreast of one another in side-by-side relationship as depicted at reference line 54. It should perhaps be noted that the number of such columns of articles accommodated can vary. For example, in the embodiment shown the additional lane for the column 18, must accommodate at least one half an article more than the inner lane described above. In fact, this lane accommodates more than one half additional articles because of the arcuate path required between the upstream and downstream end portions of the divergent portion of the apparatus. As a result of this lane being longer than the others it will be found to contain one and one half more articles than the inner lane associated with column 24.

I claim:
1. A method for orienting cylindrically shaped articles as they are advanced on a continuously moving conveyor, comprising the steps of
    (a) confining the articles between parallel side rails to form a nested pattern wherein the centers of any three adjacent articles form an equilateral triangle having one side aligned with the longitudinal direction of movement of the conveyor to define at least three columns of articles in such pattern,
    (b) diverging at least the two outside columns of articles laterally outwardly with respect to said longitudinal direction between a pair of guide rails associated with each of said outside columns,
    (c) allowing at least one inner column of articles to continue to move in said longitudinal direction on said conveyor between parallel guide rails which are spaced apart a lateral distance corresponding at least approximately to the diameter of one of the articles,
    (d) and spacing said guide rails associated with said outer columns laterally from one another a distance greater than one article diameter but less than two such article diameters so that more articles are provided in a given distance in the outside columns than in the inner column.

2. The method according to claim 1 and further including the step of converging said outside columns between their respective pairs of guide rails to provide at least three side-by-side columns of articles wherein a lateral line connecting corresponding article centers forms a 90° angle with said longitudinal direction.

3. The method according to claim 2 wherein more than three columns of articles are initially nested together and are formed into side-by-side columns, said method further including the additional step of diverging laterally at least one outside column and spacing its associated guide rail therefrom so that at least one additional article is provided in such column between said nested pattern and the pattern defined by said side-by-side columns.

4. Apparatus for orienting cylindrically shaped articles, and comprising in combination a continuously movable conveyor for advancing articles in a longitudinal direction, side rail means for confining the articles laterally as they are so advanced to form a nested pattern of articles wherein the centers of any three adjacent articles form an equilateral triangle having one side aligned with said longitudinal direction to define at least three columns of articles in said pattern, said side rail means defining a divergent portion downstream of said nested pattern, guide rail means spaced laterally inwardly from said divergent portion a distance greater than one article diameter but less than two such article diameters to urge the outside columns in said nested pattern laterally outwardly and to accommodate more articles in a given distance in said outside columns than are accommodated in an inner column, and said guide rail means further including at least one pair of inner guide rails which are parallel to one another and spaced apart laterally a distance corresponding at least approximately to the diameter of one of said articles to define an inner lane for said inner column of articles.

5. Apparatus according to claim 4 and further characterized in that said side rail means includes a convergent portion downstream of said divergent portion, and at least said guide rail means associated with said outer columns in said convergent portion defining parallel side-by-side lanes for said outside columns whereby said articles in all of said columns are arranged abreast of one another laterally in said convergent portion.

6. Apparatus according to claim 5 and further characterized in that said side rail means are so spaced laterally that more than three nested columns of articles are accommodated, said guide rail means in said divergent portion defining a plurality of lanes corresponding in number to the number of such columns, each of said lanes adjacent said inner lane on either side thereof having a width and length such that said lane can accommodate at least one half an article more than said inner lane, and each of said lanes next adjacent said inner lane having a width and length such that said lanes can accommodate at least one whole article more than said inner lane.

References Cited
UNITED STATES PATENTS
2,941,650    6/1960    Clinton _____ 198—30
2,980,229    4/1961    Carter _____ 198—31

EDWARD A. SROKA, *Primary Examiner.*

U.S. Cl. X.R.

198—34